March 4, 1924.  1,485,643
P. B. STREICH
ARTIFICIAL BAIT AND FISHHOOK THEREFOR
Filed March 20, 1922  2 Sheets-Sheet 1
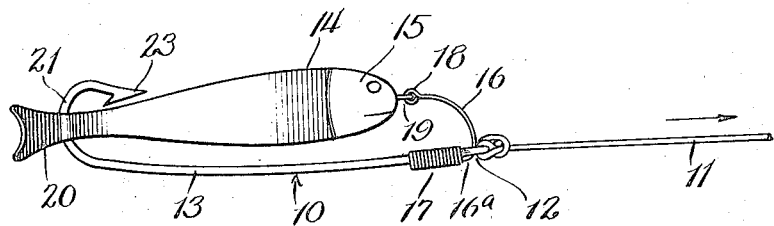
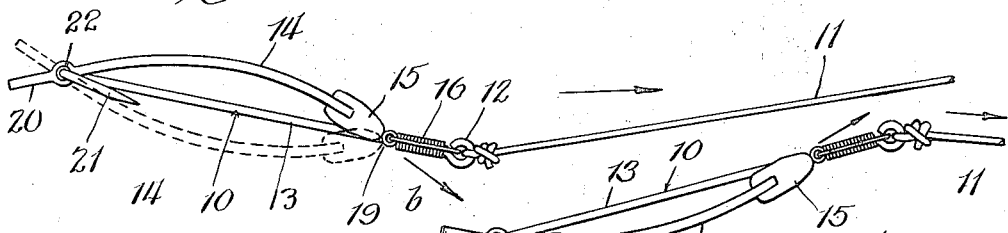
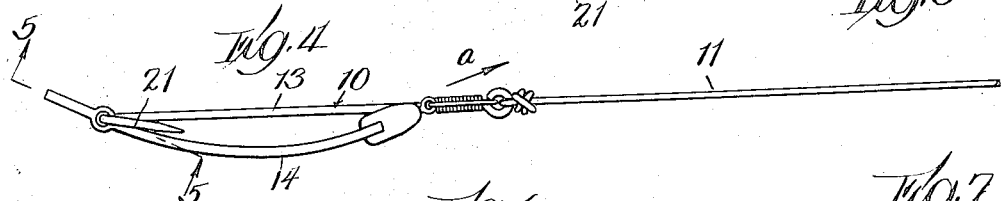
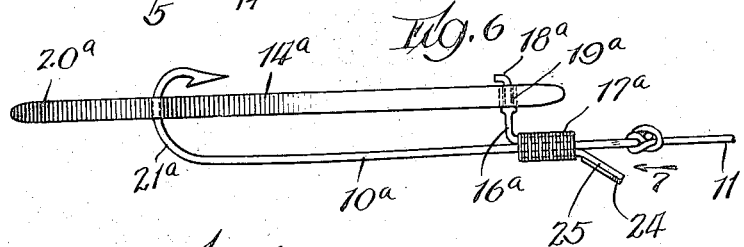
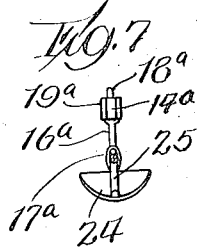
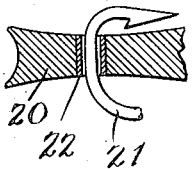
Inventor
Paul B. Streich

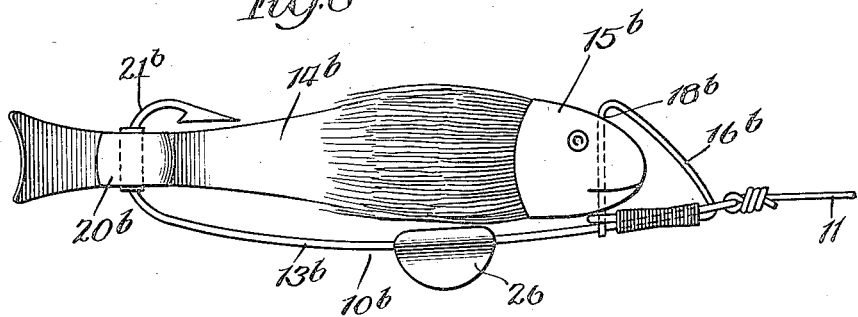
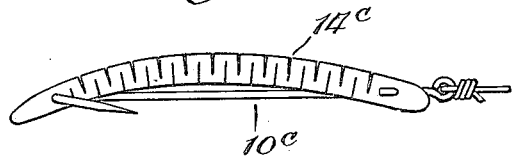
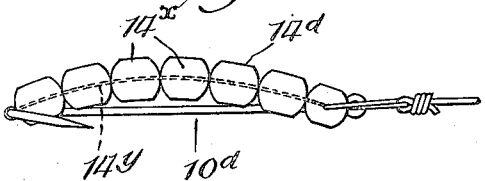
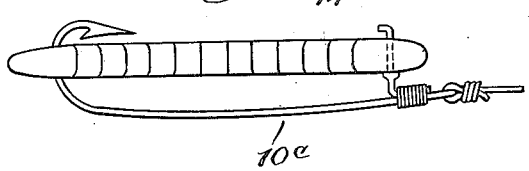
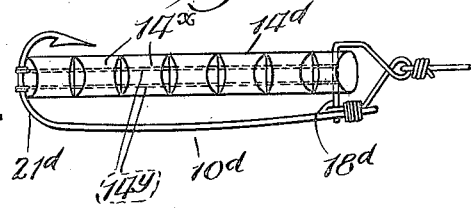
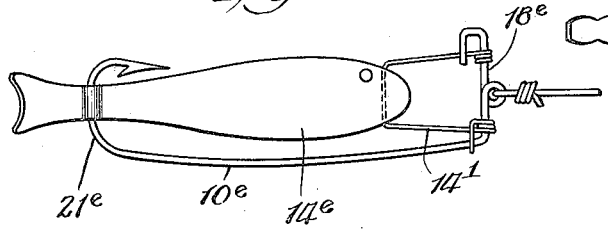
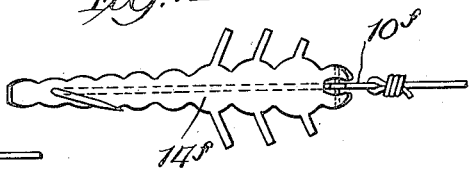

Patented Mar. 4, 1924.

1,485,643

UNITED STATES PATENT OFFICE.

PAUL B. STREICH, OF JOLIET, ILLINOIS.

ARTIFICIAL BAIT AND FISHHOOK THEREFOR.

Application filed March 20, 1922. Serial No. 545,105.

*To all whom it may concern:*

Be it known that I, PAUL B. STREICH, a citizen of the United States, and a resident of Joliet, Will County, and State of Illinois, have invented certain new and useful Improvements in Artificial Bait and Fishhooks Therefor, of which the following is declared to be a full, clear, and exact description.

This invention relates to artificial bait and fish-hooks therefor, and its principal object is to provide artificial bait for fish-hooks which, when drawn through the water, will simulate very closely the movement of a live minnow or other live fish bait swimming in the water. It is well known that many anglers prefer live bait when casting or trolling, but when live bait is used for this purpose, it soon becomes injured and dies and thereupon loses its attractiveness to fish. In accordance with the present invention, I have provided a pliable or flexible bait body shaped to simulate a minnow or other fish bait, and have mounted or secured said flexible bait body upon a support (such as a fish-hook) in such manner that the body is bowed or curved to one side of the median line of the fish-hook, whereby when the device is drawn through water the bait body, or its tail portion, will act as a rudder, thereby tending to direct the course of the bait body across the general line of travel, whereby the resistance of the water upon the outwardly bowed side of the body will bend the flexible body back past the median line of the hook, thereby reversing its action in the water, whereby the body will cross the general line of travel in the opposite way. This will give to the bait body a movement simulating very closely the movement of a minnow or other fish bait swimming through the water, thereby offering a greater attraction for fish, especially game fish. Another object is to provide artificial bait of the character described with means for deflecting it downward when drawn forward with greater speed than is ordinarily necessary, whereby the hook and bait may be caused to travel at a greater depth than when drawn along at a slower rate of speed.

With these and other objects and advantages in view, this invention consists in an artificial bait, comprising a flexible or readily bendable bait body, secured at two spaced places, with its body held in a bowed condition between said places, and capable of being readily displaced from one side of the median line of its supports to the other. The invention further consists in the several novel features hereinafter fully set forth and pointed out in the claims.

The invention is clearly illustrated in the accompanying drawing, in which Fig. 1 is a side elevation of an artificial bait and fishhook therefor, embodying a simple form of the present invention; Fig. 2 is a plan thereof; Fig. 3 is a plan showing the parts in a different position from that seen in Fig. 2; Fig. 4 is a plan showing the parts in a third position; Fig. 5 is a detail, vertical section taken on the line 5—5 of Fig. 4; Fig. 6 is a side elevation showing a slightly modified form of the said invention; Fig. 7 is an end view looking in the direction of the arrow 7 in Fig. 6; Fig. 8 is a side elevation of a second modification of the invention; Figs. 9 and 10 are plan and side views, respectively, of a third modification of the invention; Figs. 11 and 12 are plan and side views, respectively of a fourth modification of the invention; Fig. 13 is a side view of a fifth modification of the invention and Fig. 14 is a plan of a sixth modification of the invention.

Referring to said drawing, the reference character 10 designates a fish-hook of the usual and ordinary form, and 11 designates a fish line attached to the eye 12 of the fishhook. Above the shank or stem 13 of the fish-hook 10 is an artificial bait body 14 which may be shaped to simulate a minnow or any other form of live fish bait, and said body portion is made of flexible or pliable material, such as rubber, or light gauge sheet metal or other suitable material. The bait body portion is secured at two spaced places to the fish-hook 10, and the portion of the body between said two places of attachment is longer than the distance therebetween, whereby the body assumes and remains in a bowed or curved position, as is clearly seen in Figs. 2 to 4, inclusive, but is capable of being forced from one side of the median line of the hook to the other. In the form illustrated in Figs. 1 to 5, the forward end of the body portion 10 is provided with a head 15, which may be made of cork, wood, or other buoyant material, and the head is shown as supported from an upstanding arm 16, which is fastened to the fish-hook in any suitable manner, as for instance by winding wire or line 17 around one end 16ª of the arm 16 and shank 13 of the hook. The upper end of the arm 16 is formed with an eye 18 which is hooked into an eye 19 secured in the forward end of the head 15 of the bait body. The rear end of the bait body, for instance its tail portion 20, is secured upon the hooked end 21 of the fish-hook, and, as a preference, a metal sleeve or ferrule 22 is embedded in the material of the body and surrounds the hooked end of the fish-hook. This construction provides a reinforcement for the flexible body portion at its point of attachment to the fish-hook, and prevents any undue wear on said flexible portion. The barb 23 of the fish-hook projects over the top of the bait body, as shown. The two supports for the bait body are designed to permit free movement of the body thereon, whereby it may require but little resistance against the side of the bowed body to deflect it from one side of the median line of the hook to the other side.

In use, the baited hook may be drawn through the water in the customary ways. The angler may use it in casting or in trolling, in the usual manner. Preferably, the entire device is sufficiently buoyant that it will float near the surface of the water, or, if desired, the weight of the parts may be made such that it will tend to sink deeply into the water. When the hook is in alignment with the fish line, as seen in Fig. 4, the bait body portion 14 will lie on one side or the other of the median line of the fish-hook. When the device is drawn through the water, the bowed bait body will act as a rudder for the device, tending to deflect its course to one side or the other of the line of travel. For instance, if the bowed body occupies the position shown in Fig. 4, the bowed body will tend to cause the latter to turn across the general line of travel, in the direction of the arrow $a$ in Fig. 4. After the body portion has crossed or partly crossed the line of travel, the outwardly bowed side thereof (see Fig. 3) is moved against the body of water and the resistance produced will cause the body to be bent or deflected to the other side of the median line of the fish-hook. In this position, it will tend to cross the line of travel in the direction of the arrow $b$ in Fig. 2, and when it has partly crossed said line of travel, the resistance of the water deflects the body back to the other side of the median line of the fish-hook. This continued movement of the bait body gives the moving body the appearance of a live bait flapping its tail while swimming in the water.

In the modified form shown in Figs. 6 and 7, the bait body $14^a$ may simulate an angle worm. The body $14^a$ is mounted upon or secured to two supports, as before, and that portion of the body between the supports is bowed, as in the preferred form. In this case, the arm $16^a$, which supports the forward end of the body, extends up from the fish hook $10^a$ through an eye $19^a$ in the forward end of the body and its upper end is bent latterly as at $18^a$, to prevent accidental disconnection between the bait body and supporting arm $16^a$. The rear end of the body portion is mounted on the hooked end $21^a$, as in the preferred form, and the tail portion $20^a$ may extend back of said hooked portion for a considerable distance, if so desired.

A fin 24 may be provided at the forward end of the hook, which fin may be in the form of a flat piece of metal secured to the hook by a piece of wire 25 soldered to the fin and fastened to the shank of the hook by a piece of string or wire $17^a$ which is wrapped around the wire 25 and shank. The fin extends forwardly and downwardly of the hook $10^a$ and acts to deflect the course thereof in a downwardly direction. The result is that when the device is pulled along at a moderately slow speed, the bait will remain near the surface of the water but if drawn along at a considerably higher rate of speed, the declined fin will tend to submerge the bait to a greater extent. This fin may or may not be used in connection with the remainder of the device, but some anglers prefer to have the bait sink lower into the water when fishing for certain kinds of fish, and the fin provides a simple means for accomplishing this result.

The bait body portion may be shaped to simulate any well known bait, and may be made more alluring and attractive by the addition of glittering or highly colored objects.

In the modified form illustrated in Fig. 8, both the head $15^b$ and a part $20^b$ of the tail portion are formed of buoyant material such as cork, wood or the like and are connected together by a bowed, flexible or pliable body portion $14^b$. The head $15^b$ is rotatively mounted upon a vertical post or stem $18^b$ which is formed upon the end of an arm $16^b$ secured to the fish hook $10^b$ in any suitable manner, and the portion $20^b$ of the tail is secured upon the hooked end $21^b$ of the fish hook. A weight 26 is secured upon the shank or stem $13^b$ of the fish hook. The form just described provides artificial bait which when drawn through the water simulates the swimming movements of a small fish, and the buoyant portions $15^b$, $20^b$, tend to hold the bait up from the bed of a body of water, in case the weight is made sufficiently heavy to carry the bait to the bed. Consequently, the bait will simulate very closely a live fish swimming close to the bottom of a body of water.

In the form illustrated in Figs. 9 and 10, the bowed flexible body $14^c$ is secured at two spaced places upon the fish hook $10^c$ and in this case the body is shown as shaped to simulate a worm. The bait body is cut or slit crosswise at a large number of places, the cuts or slots extending in from the sides of the body and those on one side being arranged intermediate those on the other side. This not only provides a very flexible comparatively heavy or thick body, but the slits give the appearance of ribs on said body.

In the modified form illustrated in Figs. 11 and 12, the bowed flexible body portion 14$^d$ is secured upon the fish hook 10$^d$ at two spaced places, as before, and in this case the body portion is shown as formed of separate blocks of materials 14$^x$ mounted upon pieces of string or wire 14$^y$ that extend between and are secured to the post 18$^d$ and hooked end 21$^d$ of the fish hook. The blocks 14$^x$ may be made of cork or other buoyant material, if desired.

In the form illustrated in Fig. 13, the flexible bait body portion 14$^e$ is shown as mounted at one end on the hooked end portion 21$^e$ of the fish-hook 10$^e$, the other end being secured upon the bail like member 14$^l$, which is mounted on a post 18$^e$ and has a limited amount of movement from one side of the median line of the hook to the other, thereby permitting the forward end of the bait body to swing or move from one side of the median line to the other.

In the modified form illustrated in Fig. 14, the bait body 14$^f$, instead of being bendable from side to side, is mounted upon the fish hook 10$^f$ in such manner that it is bendable in an up and down direction, and is capable of being deflected from an upwardly bowed position to a downwardly bowed one. In being drawn through the water, its body simulates the wiggling movements of a crawfish.

More or less variation of the exact details of construction of this invention is possible without departing from the spirit of the invention; I desire, therefore, not to limit myself to the exact form of the construction shown and described, but intend in the following claims to point out all of the invention disclosed herein.

I claim as new and desire to secure by Letters Patent:

1. Artificial bait for fish-hooks comprising, a bait holding member and a flexible, normally bowed bait body portion secured in its bowed condition, at two spaced places, on said bait body holding member, and capable of being flexed to pass from one side of a line, passing through its points of securement to the other side thereof.

2. Artificial bait for fish-hooks comprising, a fish-hook, provided with two spaced body holding members, and a flexible, normally bowed bait body portion secured in its bowed condition, on said body holding members of the fish-hook, and capable of being flexed to pass from one side of a line, passing through said place of securement, to the other side thereof.

3. Artificial bait for fish-hooks comprising, a bait body holding member, having two spaced body holding members, a bait body having a buoyant head and having a flexible, normally bowed portion secured in its bowed condition, on said body holding members, and capable of being flexed to pass from one side of a line, passing through said place of securement, to the other side thereof.

4. Artificial bait for fish-hooks comprising, a bait body holding member, a flexible, normally bowed bait body and tail portion secured, in its bowed condition, at two spaced places on said body holding member, with its tail portion projecting back of its point of support on said body holding member, said flexible bait body capable of being flexed to pass from one side of a line, passing through said places of securement, to the other side thereof.

5. Artificial bait for fish-hooks comprising, a bait body holding member, a normally bowed rubber body, and a head of buoyant material, said body and head being secured, at the front and back, to said bait body holding member.

6. Artificial bait for fish-hooks comprising, a bait body holding member, having a transverse arm, a flexible normally bowed bait body secured at one end on said arm and at its other end to a second arm on said holding member, and a ferrule embedded in said bait body and encircling said second arm.

7. Artificial bait for fish-hooks comprising, a bait body holder having two spaced body holding members, and a flexible normally bowed bait body connected to both of said body holding members, and normally deflected out of line therewith.

PAUL B. STREICH.